United States Patent [19]

Lavigne, Jr. et al.

[11] 4,124,995

[45] Nov. 14, 1978

[54] EXPANSION DEVICE

[75] Inventors: William J. Lavigne, Jr., Fayetteville; William Agley, Syracuse; George M. Case, Kirkville, all of N.Y.

[73] Assignee: Carrier Corporation, Syracuse, N.Y.

[21] Appl. No.: 742,716

[22] Filed: Nov. 17, 1976

[51] Int. Cl.$^2$ .............. F25B 41/04; F16K 15/00; F16K 17/00; F16K 21/04
[52] U.S. Cl. ......................................... 62/224; 137/542
[58] Field of Search ................ 62/224, 216, 527, 528; 137/542

[56] References Cited

U.S. PATENT DOCUMENTS

| 953,330 | 3/1910 | Gordon | 137/542 |
|---|---|---|---|
| 1,785,271 | 12/1916 | Lemex | 137/542 |
| 2,479,620 | 8/1949 | Ingham | 137/542 |
| 2,634,748 | 4/1953 | Morrison | 137/542 |
| 2,909,192 | 10/1959 | Dobrick | 137/542 |
| 2,967,403 | 1/1961 | Lange et al. | 62/224 |
| 3,756,273 | 9/1973 | Hengesbach | 137/542 |
| 3,945,396 | 3/1976 | Hengesbach | 137/542 |

FOREIGN PATENT DOCUMENTS 2,330,168 11/1975 Fed. Rep. of Germany .......... 137/542

*Primary Examiner*—Lloyd L. King
*Attorney, Agent, or Firm*—J. Raymond Curtin; Donald F. Daley

[57] ABSTRACT

A refrigerant flow control assembly for metering the flow of refrigerant, under low load and normal operating conditions, from the high pressure side to the low pressure side of refrigeration machine. The assembly includes a valve plate defining a circular port for the flow of refrigerant therethrough. A valve plug is provided having a conical surface at one end for communication with the circular port, and a stem at the other end. A valve plug support is operatively connected to the valve plate for mounting thereon the valve plug for slidable movement between a closed position and an open position along a line coincident with the axis of the valve plug, which line is perpendicular to and intersects the plane of the circular port at its center. At the closed and open positions, the valve plug defines annular ports, the respective areas of which are determined by an operating characteristic of the refrigeration machine, for passing therethrough gaseous and liquid refrigerant under low load and normal operating conditions.

6 Claims, 4 Drawing Figures

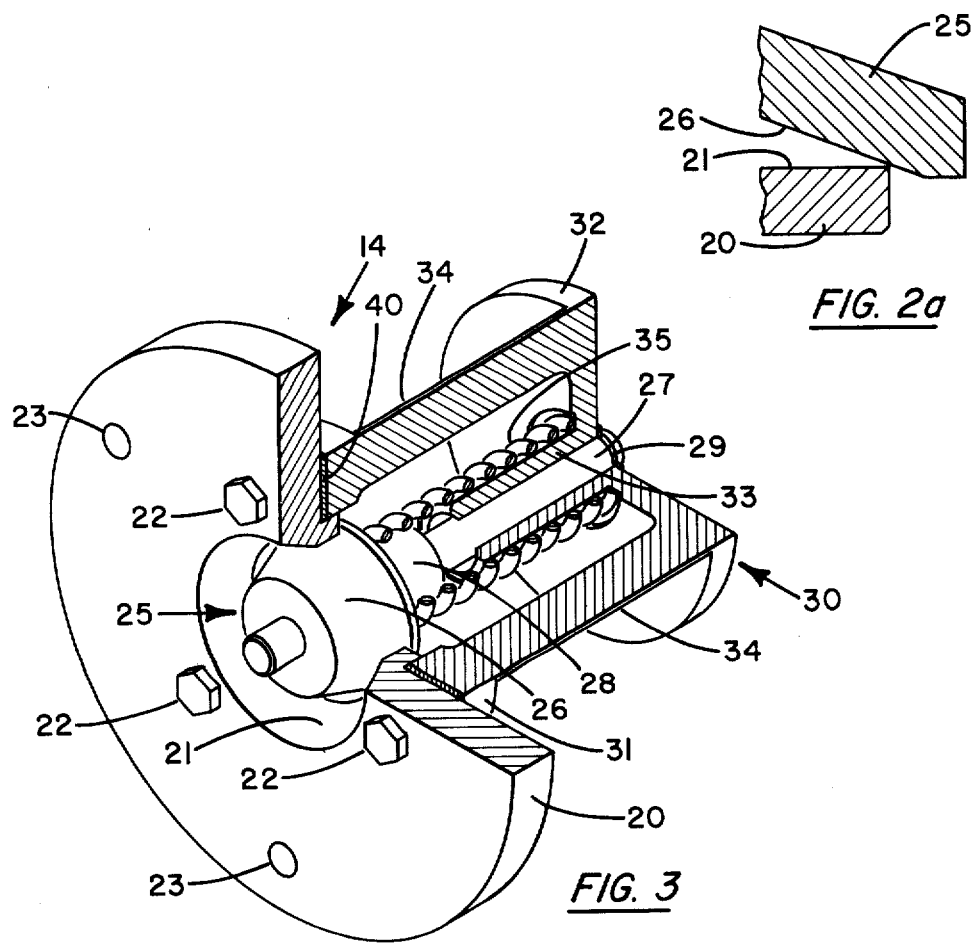
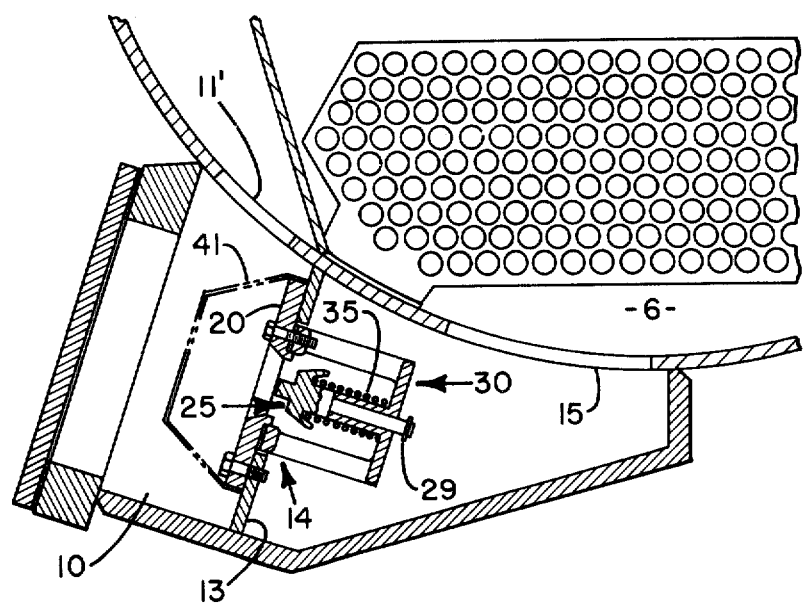

EXPANSION DEVICE

BACKGROUND OF THE INVENTION

This invention relates broadly to a refrigeration machine, and more particularly to a high tonnage, low pressure refrigeration machine. Still more particularly, this invention relates to a refrigerant flow control device particularly equipped to pass liquid and gaseous refrigerant under normal and low load conditions, and to precisely control the flow of refrigerant by a precisely sized annular port.

In high tonnage refrigeration machines, a compressor is arranged to extract gaseous refrigerant from an evaporator, compress the refrigerant, and pump it to a condenser where it is cooled and condensed. In communication with the condenser, there is normally provided a receiver for collecting liquid refrigerant formed in the condenser prior to its passage to the evaporator. The receiver usually contains refrigerant both in the liquid and gaseous phases. The level of the liquid refrigerant collected in the receiver is a function of the pressure difference between the high pressure side and the low pressure side of the machine and the load on the machine, it being understood that the condenser and the receiver are disposed in the high pressure side and the evaporator in the low pressure side of the machine. Refrigerant flow from the receiver to the evaporator is regulated by valve mechanisms to pass an amount related to the load on the machine and automatic controls such as suction guide vanes are provided for the purpose of maintaining flow rates corresponding to machine loading. The valve mechanisms disclosed by the prior art for passing the proper amount of refrigerant from the receiver to the evaporator are adapted to meet two operating conditions of a high tonnage refrigeration machine: normal operating conditions and low loads operating conditions.

For normal operating conditions there is provided a float valve mechanism in the receiver which passes the proper amount of refrigerant as determined by the level of the liquid therein, which, in turn is determined by the loading on the machine. The evaporator contains a multiplicity of tubes usually referred to as tube bundles through which the medium to be cooled by the machine is passed in heat transfer relation with the refrigerant and the evaporator. Under these conditions, the heat supplied to the refrigerant from the medium being cooled is sufficient to cause the liquid refrigerant in the evaporator to boil vigorously. The boiling refrigerant thus wets all the tubes in the evaporator, providing optimum heat transfer between the medium and the refrigerant.

At low loads, on the other hand, the refrigerant in the receiver is primarily in the gaseous state with the liquid level being below the level necessary to actuate the float valve mechanism to the open position. Moreover, at low loads, a relatively small quantity of heat is given off by the medium and consequently the refrigerant does not boil vigorously enough to wet all the tubes, particularly those in the upper rows of the bundle, causing the efficiency of the evaporator to decrease. Also, under extended periods of low load or extremely low loads, the refrigeration machine may become unstable. To overcome these practical difficulties, the prior art discloses various electrical, pneumatic, and mechanical devices which actuate the float valve in response to an operating characteristic of the refrigeration machine, regardless of the liquid level in the receiver. The gaseous and liquid refrigerant passed by the remote actuation of these devices maintains high evaporator efficiency at low loads by agitating the liquid refrigerant in the evaporator. It also stabilizes the refrigeration machine by maintaining proper pressure differential between the high and low pressure sides.

It is seen then that the refrigerant flow control devices disclosed by the prior art have two separate and distinct flow control mechanisms, one which will operate only under normal load conditions, and the other which will operate only under low load conditions. Such devices have the disadvantage of numerous moving parts, which may influence their reliability and the size and shape of the receiver. Moreover, such low load flow control devices are usually electrically, mechanically, and/or pneumatically complex, requiring a high degree of skill in calibrating, maintaining, and repairing them.

SUMMARY OF THE INVENTION

Accordingly, it is an object of the invention to provide a refrigerant flow metering device which will operate under both normal operating conditions and low load conditions.

It is another object of the invention to provide a refrigerant flow metering device which is mechanically simple and highly reliable.

It is another object of the invention to provide a refrigerant flow metering device which requires minimal skills in its assembly, repair and maintenance.

These and other objects of this invention are attained by providing a valve plate having a circular valve port for the flow of refrigerant therethrough. A valve plug is provided for communication with the valve port, the valve plug having a stem at one end and a right conical surface at the end in communication with the circular port of the valve plate. A valve plug support is provided which is operatively connected to the valve plate for mounting the valve plug for slidable movement between a closed position and an open position along a line coincident with the axis of the valve plug which line is perpendicular to and intersects the center of the circular port. At its closed and open positions, the valve plug in relation to the circular port, defines annular ports, the respective areas of which are determined by an operating characteristics of the refrigeration machine, for passing therethrough gaseous and liquid refrigerant under low load and normal operating conditions. A helical spring is provided to bias the valve plug towards its closed position. There is also provided a peelable shim operatively disposed between the valve plate and the valve plug support for accurately adjusting the annular port at the closed position of the valve plug.

BRIEF DESCRIPTION OF THE DRAWINGS

Other objects and features of this invention will be apparent upon consideration of the ensuing specifications and drawings in which:

FIG. 2 is a fragmentary view of the receiver portion of a refrigeration machine shown in FIG. 1 further illustrating the control mechanism of the invention with the valve plug in the open position.

FIG. 2a is a fragmentary cross-section of the conical surface portion of the valve plug and the circular port illustrating the spaced relationship there between when the valve plug is in the closed position.

FIG. 3 is a fragmentary isometric view of the flow control mechanism of the invention illustrating the structure thereof.

DESCRIPTION OF THE PREFERRED EMBODIMENT

Figure 1:
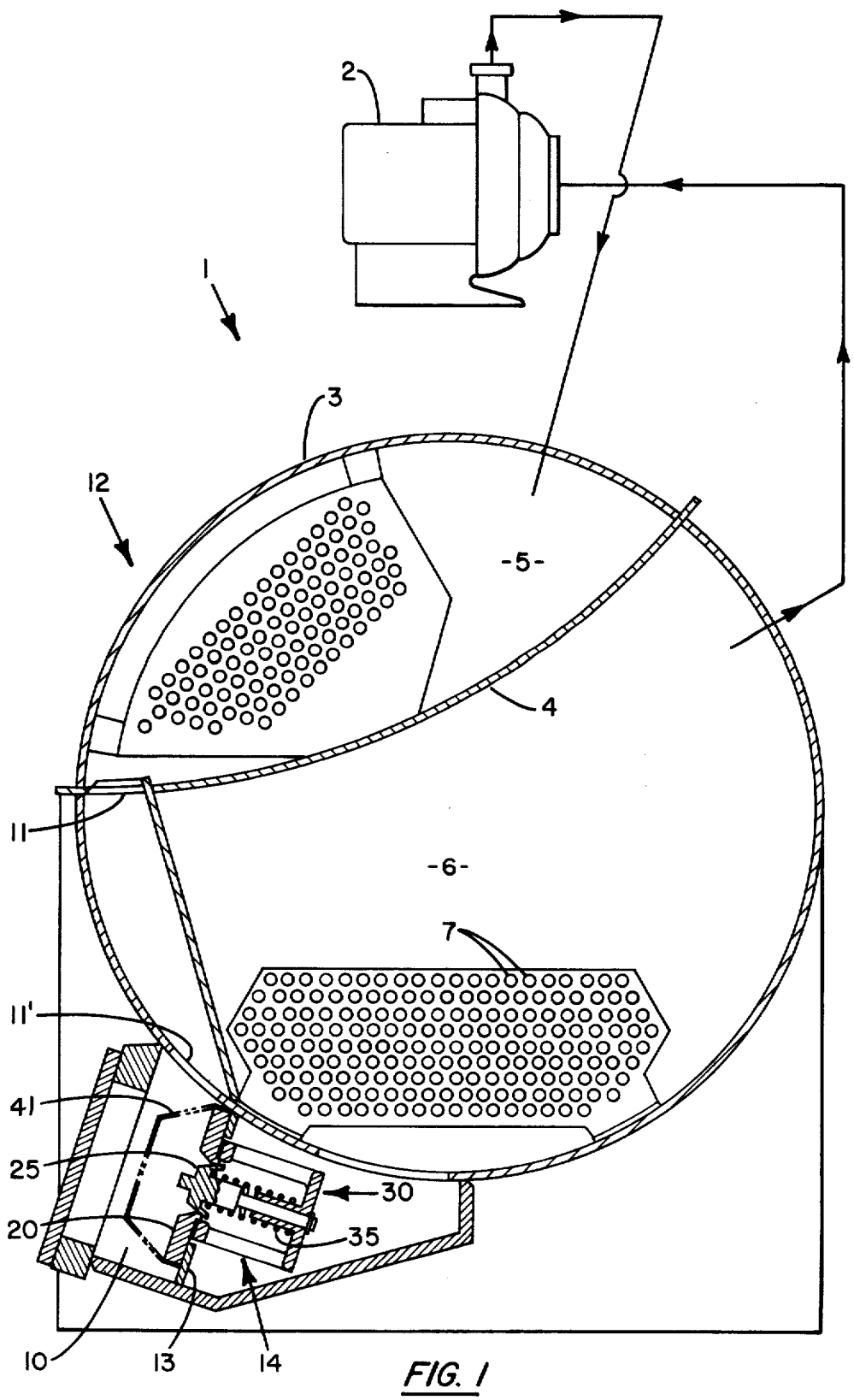
FIG. 1 is a schematic view of a refrigeration machine wherein the evaporator-condenser section is shown in sectional elevation, the machine incorporating a flow control mechainsm of the present invention which is shown with the valve plug in a closed position.

Referring more particularly to the drawings, there is shown a centrifugal refrigeration machine 1 for cooling a relatively large quantity of water or brine. Refrigeration machines of this type are employed to cool water or brine flowing within a closed circuit forming a part of an air conditioniing installation. The machine 1, having a refrigerant cooled motor driven compressor 2, includes shell 12 for housing the evaporator-condenser unit associated with the machine. The shell has a partition 4 therein for separating the high pressure condenser section 5 from the low pressure evaporator section 6. A tube-bundle 7, located in evaporator section 6, is provided for passing therethrough water to be chilled.

Refrigerant receiver 10 is provided for receiving gaseous and liquid refrigerant from the condenser 5 through openings 11 and 11' in communication therewith. The high pressure side of the refrigeration machine is separated from the low pressure side by physical barrier 13 of receiver 10 which, in communication with an orifice therethrough, is adapted for fixedly mounting refrigerant flow control assembly 14 thereon.

Referring now to FIG. 3, refrigerant flow control assembly 14 includes valve plate 20, valve plug 25 having a conical surface at one end, valve plug support 30, and helical spring 35. Valve plate 20 defines a circular port 21 for operative communication with the conical portion 26 of valve plug 25. Equidistant from the center of circular port 21 are a plurality of circumferentially spaced holes 23 for bolting said valve plate to physical barrier 13 (FIG. 2). Valve plug support 30 is a unitized rigid structure comprising an annular member 31, a circular back plate 32, a cylindrical valve plug guide 33 protruding from said back plate and extending therethrough and a plurality of parallel rigid ribs 34. The valve plug support is adapted for mounting to valve plate 20 through annular member 31 by bolts 22 such that axis of cylindrical guide 33 is perpendicular to and intersects the plane of circular port 21 at its center. Valve plug 25 comprises a right conical section at the end of a stepped stem of circular cross-section for communication with circular port 21. The stepped stem has a guide portion 27 of which the outside diameter is operatively smaller than the inside diameter of cylindrical valve plug guide 33 and adapted for slidable movement therewith, and a stop portion 28 of which the outside diameter is equal to the outside diameter of said cylindrical valve plug guide 33, and which limits the slidable movement of said valve plug a distance that is related to the operating characteristic of the machine. The travel of valve plug 25 in the direction of circular port 21 is limited by stop ring 29. Helical spring 35 has a line of action coincident with the axis of the valve plug, and is adapted to bias valve plug 25 in the direction of circular port 21 and is circumferentially guided by cylindrical guide 33 and stop portion 28 of valve plug 25. The spring rate is such that it requires minimum increase in pressure differential to be felt over the valve plug to permit the plug to move between a cracked and a full open position.

Assembled, valve plug 25 of refrigerant flow control assembly 14 translates in slidable cooperation with cylinder guide 33 from a closed position as illustrated in FIGS. 1 and 2a, to an open position as illustrated in FIG. 2. In the closed position, the travel of valve plug 25 is limited by stop ring twenty-nine such that conical surface 26 and circular port 21 define an annular port, the area of which is preset in relation to an operating characteristic of the refrigeration machine. (See FIG. 2a illustrating the spaced relationship between conical surface 26 of the valve plug and circular port 21 at the closed position of valve plug 25.) To facilitate adjustment of said annular port to the predetermined area in the assembly stage, annular peelable shim 40 is provided between valve plate 20 and annular member 31 of valve plug support 30. By utilizing such peelable shim, the predetermined area of the annular port is achieved to a very high degree of precision.

In the open position, the annular port defined by the spaced relationship between the conical surface 26 of the valve plug and circular port 21 of the valve plate has a port area that is determined in relation to an operating characteristic of the refrigeration machine. The port area is controlled by the distance between stop portion 28 of the valve plug at its closed position, and cylindrical guide 33. A high degree of accuracy in the area of the annular port at the open position of the valve plug is achieved with relatively high tolerances in the maximum travel of the valve plug since the ratio of the change in annular area to the change in axial distance is considerably less than one. For example, for a conical section in which the angle between the axis and the generator line of the cone is 20°, such ratio is approximately 1:3.

Considering the operation of the refrigerant flow control assembly, under operating conditions in which the pressure differential between the high and low pressure sides reaches a certain minimum determined by an operating characteristic of the machine, the valve plug slides from the closed position to the open position in response to said minimum pressure differential. As previously noted, due to the low spring rate of spring 35, a minimal change in pressure differential above said certain minimum operates to force plug valve 25 from cracking to full open position.

Flow of refrigerant from the high pressure side to the low pressure side under a differential pressure above said minimum may be defined as flow under normal operating conditions in which the valve plug remains in the open position. Under these conditions, the receiver maintains a level of liquid refrigerant which is usually above the circular port. Since the flow through the annular port is under pressure, the conically shaped flow stream is largely directed away from the spring and valve plug guide, thereby minimizing the corrosive effect of the refrigerant on the stem and cylindrical guide therefore. Debris in the refrigerant which bypasses protective screen 41 is also directed away from cylindrical guide 33 by said conical flow stream thereby minimizing collection of such debris in cylindrical guide 33.

When the pressure differential between the high and low pressure sides falls below said certain minimum, which is defined as low lift operating conditions, the valve plug will move to the closed position. This will drastically reduce the amount of refrigerant flowing from the receiver to the evaporator. Refrigerant will accumulate, therefore, in the receiver and consequently in the condenser. This refrigerant will be removed from the evaporator. The evaporator and condenser leaving temperature differentials will both increase as a result of this refrigerant migration, thereby increasing the system differential pressure. This process will continue until an equilibrium point is reached which will maintain the system differential pressure at one above the design minimum.

Under low load conditions, the refrigerant in the receiver may be in both the liquid and gaseous state but predominantly in the gaseous state with the liquid level usually below the height of the circular port. However, to maintain the efficiency of the evaporator at a high level, it is desirable to pass both liquid and gaseous refrigerant to the evaporator to cause agitation to the liquid therein to wet all the tubes of the tube bundle. This is accomplished by the annular port defined by the circular port and the valve plug. The annular port at low loads, in addition to increasing the efficiency of the evaporator, also stabilizes the refrigeration machine bypassing vapor flow from the high pressure side to the low pressure side.

While we have described a preferred embodiment of our invention, it is to be understood that the invention is not limited thereto since it may be otherwise embodied within the scope of the following claims.

What is claimed is:

1. In a refrigeration machine having a high pressure side and a low pressure side, an evaporator positioned on the low pressure side, a condenser positioned on the high pressure side, and a compressor arranged to extract gaseous refrigerant from the evaporator and deliver the refrigerant to the condenser, a refrigerant flow control assembly for metering the flow of refrigerant and maintaining a minimum system differential pressure under low load and normal operating conditions, from the high pressure side to the low pressure side of the machine, including a receiver for collecting liquid and gaseous refrigerant from the condenser for passage to the evaporator, and having a first chamber in fluid communication with the condenser and a second chamber, separated from the first chamber by a barrier, in fluid communication with the evaporator, a valve plate defining a circular port for the flow of refrigerant therethrough from the first chamber of the receiver to the second chamber of the receiver, and wherein the circular port is positioned so that liquid refrigerant passes therethrough at both low load and normal operating conditions, a valve plug having a right conical surface at one end for operative communication with said circular port to regulate the refrigerant flow therethrough to maintain a minimum pressure differential between the high pressure side and low pressure side of the machine, and a stem at the other end, valve plug mounting means operatively connected to said valve plate for slidably mounting said valve plug for translational movement between a closed position and an open position in relation to said circular port, along a line coincident with the axis of said valve plug, which line is perpendicular to and intersects the plane of said circular port at its center, stop means to retain the valve plug in a spaced relation to the circular port when the valve plug is in the closed position thereby creating a predetermined annular port area for the flow therethrough of refrigerant under low load conditions, and a resilient member operatively disposed between said valve plug and said valve plug mounting means, the line of action of said resilient member being substantially coincident with the axis of said valve plug, for biasing said valve plug between the closed and open positions in response to low load operating conditions and normal operating conditions of the refrigeration machine.

2. A refrigerant flow control assembly according to claim 1 wherein the resilient member has a minimum tension so that a minimum increase in the pressure differential felt over the valve plug causes the plug to move from the closed position to the open position.

3. A refrigerant flow control assembly according to claim 2 wherein the stem of said valve plug includes a guide portion and a stop portion, and said valve plug mounting means includes a unitized rigid structure comprising an annular member rigidly connected to a circular back plate by a plurality of parallel ribs, said annular member being adapted for mounting said unitized rigid structure to the valve plate concentric with the circular port defined by said valve plate, said circular back plate including a cylindrical valve plug guide protruding on the inside thereof and extending therethrough, the axis of which is perpendicular to and intersects the centerpoint of the annular member and the circular back plate, the inside diameter of which is adapted for slidabe communication with the guide portion of the stepped stem and the outside diameter of which is equal to that of the stop portion of said valve plug, for guiding the translational movement of the valve plug along its axis between said closed and open positions.

4. A refrigeration flow control assembly according to claim 3 wherein said resilient member is a helical spring operatively disposed between one surface of the valve plug and the circular back plate of the unitized rigid structure and guided by the cylindrical valve plug guide and the stop portion of the valve plug.

5. A refrigerant flow control assembly according to claim 4 wherein the conical surface of the valve plug extends toward the circular back plate a distance sufficient to direct refrigerant which flows through the annular port away from the helical spring and cylindrical valve plug guide.

6. A refrigeration flow control assembly according to claim 5 including a peelable annular shim operatively disposed between the valve plate and the unitized rigid structure valve support for adjusting the annular port area at the closed position of the valve plug.

* * * * *